March 31, 1964 C. V. BERGSTROM 3,126,978
ACOUSTICAL AND THERMAL INSULATION
Filed Feb. 13, 1961
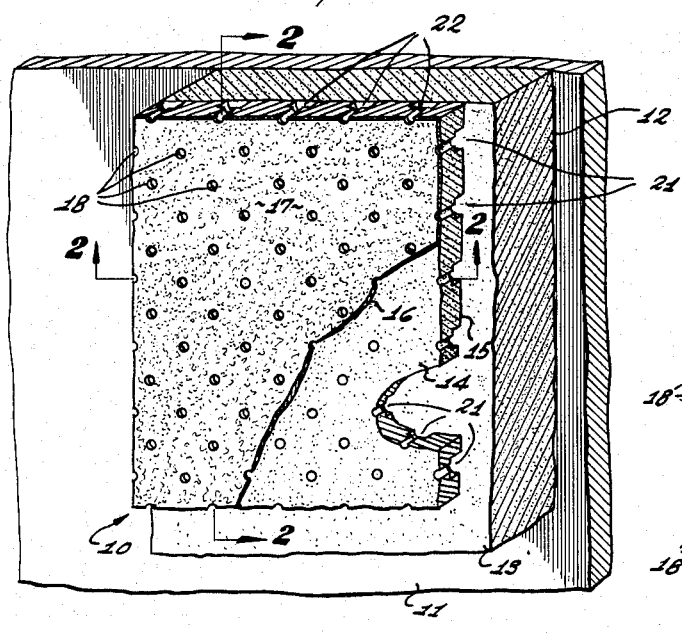
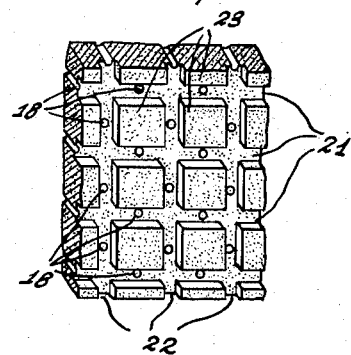
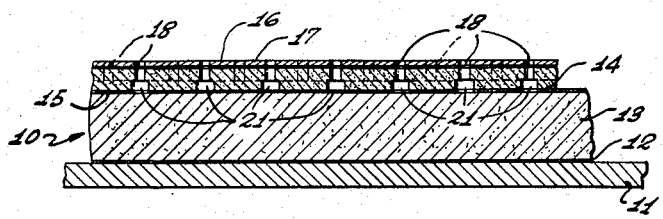
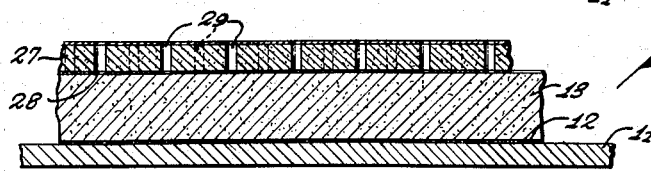
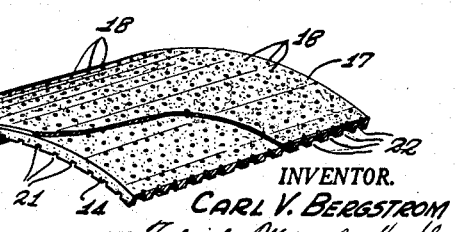
INVENTOR.
CARL V. BERGSTROM
BY *Fulwider Mattingly & Huntley*
Attorneys United States Patent Office 3,126,978
Patented Mar. 31, 1964

3,126,978
ACOUSTICAL AND THERMAL INSULATION
Carl V. Bergstrom, Long Beach, Calif., assignor of one-half to Peter C. Parfitt, Palos Verdes Estates, Calif., one-eighth each to Ethel B. Keithley, Evelyn B. Olson, and William N. Bergstrom, and one-sixteenth each to Richard J. Thurrell and Roger B. Thurrell
Filed Feb. 13, 1961, Ser. No. 88,728
6 Claims. (Cl. 181—33)

This invention relates generally to sound absorbing structures employed, for example, in the interiors of enclosures such as rooms, auditoriums, offices, machinery spaces and shipboard compartments, etc., to eliminate objectionable reverberations and reduce the intensity of sounds. The sound absorbing structures according to the present invention may have thermal insulation features in themselves and may be combined with thermal insulation material to form an acoustic and thermal insulating sandwich for application to structural surfaces, such as the walls or ceilings of the enclosures aforesaid.

The acoustical material or sound absorbing structure according to the present invention is preferably formed of a foamed plastic material such as synthetic rubber, polyvinyl chloride, polyurethane, polystyrene and other plastic materials which can be foamed in either open or closed cell construction, and is preferably of a flexible and resilient character having sufficient structural body to permit its being cemented directly to a supporting surface without additional structural mounting or covers.

Where a separate layer of thermal insulation is provided in a sandwich structure, it may also take the form of a flexible or rigid foamed plastic, preferably one of the materials given by way of example for the acoustical layer.

According to the present invention the outer surface of the sound absorbing material is provided by a tough plastic covering, resistant to injury and wear and which may provide a decorative surface as well. This plastic covering may have any desired composition, materials known commercially as Naugahyde and Koroseal being especially suited.

It is also within the scope of the present invention, in certain forms of the sound absorbing material, to provide perforations extending therethrough and channels communicating with such perforations to expose the sound waves to a greater surface area of absorbing material and also to expose the multi-cell structure of the acoustical layer for this purpose.

It is therefore an object of the present invention to provide an improved sound absorbing structure for enclosures.

Another object of the invention is the provision of an improved sound absorbing material formed from a foamed plastic and having structural features increasing the sound absorbing characteristics thereof.

A further object of the invention is the provision of an improved sound absorbing material formed from a foamed plastic and having perforations therethrough and channels therein, intercommunicating with each other to increase the sound absorbing surfaces thereof.

Another object of the invention is the provision of an improved combined acoustical and thermal insulating structure formed of primarily acoustical and primarily thermal insulating layers joined together by an adhesive and mounted by an adhesive to the surface of a supporting wall or ceiling.

Yet another object of the invention is the provision of an improved combined acoustical and thermal insulating structure of sandwich form having an inner layer, primarily directed to thermal insulation, mounted directly upon a structural surface and an outer layer, primarily directed to sound absorption, mounted on the inner layer, each of the layers being formed of a foamed plastic and each contributing both thermal and acoustic insulation to the structure, and with the outer layer having structural features increasing its sound trapping and absorbing characteristics.

A still further object of the invention is the provision of a flexible sound absorbing material in sheet form, which may be supplied in rolls and applied to the surface of a supporting structure by being cemented or otherwise adhered thereto, and which is formed of a foamed plastic having an outer covering of tough plastic cloth adhered thereto.

These and other objects and features of the invention will be readily apparent to those skilled in the art from the following description of certain presently preferred embodiments of the invention and the appended drawings thereof in which:

FIGURE 1 is a perspective sectional view of the combined acoustical and thermal insulating structure bonded to the surface of a supporting wall;

FIGURE 2 is a sectional view on the line 2—2 of FIGURE 1;

FIGURE 3 is a perspective sectional view of the back face of the layer of sound absorbing material in the structure of FIGURE 1;

FIGURE 4 is a sectional view similar to FIGURE 2 but showing a modified form of the invention; and FIGURE 5 is a perspective view showing the manner in which the sound absorbing material may be supplied as a flexible sheet in rolled form.

From the previous description of the present invention it will be clear that the primarily sound absorbing material may be used alone or in combination with a layer of primarily thermal insulation and that, alone or in combination, it may be applied to any interior surface of an enclosure in which it is desired to reduce the intensity of sounds. This invention is specifically illustrated in FIGURE 1 as a combined acoustical and thermal insulating structure 10 applied to a metal wall such as a ship's bulkhead or overhead wall 11 having a layer of foamed plastic thermal insulating material 13 mounted on the surface thereof by a pressure sensitive contact cement or other adhesive 12. The layer 13 may be made up of large or small sheets, panels or tiles as desired or available and preferably incorporates a dense, closed cell construction of the foamed plastic. The primarily sound absorbing layer of foamed plastic is indicated at 14, adhesively bonded by a suitable cement or other adhesive 15 to the surface of the primarily thermal insulating layer 13. To the outer surface of the acoustical layer 14 is adhesively bonded, as by a similar cement or other adhesive 16, a tough plastic covering layer 17 which may be not only structurally strong but of decorative appearance such as provided by the commercial materials: Naughahyde and Koroseal.

The sound absorbing layer 14 and its cover 17 are provided with a multiplicity of perforations or holes 18 therethrough which are arranged in rows, with the holes in adjacent rows offset one-half the distance between the holes to arrange the holes in a diamond configuration, as appears more clearly in FIGURE 1 of the drawing. The purpose of offsetting the rows of holes is to provide for their interconnection by channels at the back face of the sound absorbing layer while leaving attachment tabs of relatively large area for joining the thermal and accoustical layers together. In this arrangement, which is shown more particularly in FIGURES 1–3, the holes in alternate rows are directly connected by a group of channels 21 in the back face of the acoustical layer which extend in one direction, while the holes in the intermediate rows are connected by a similar group of channels 22 extending at right angles to the first group of channels. The groups of channels 21 and 22 intersect each other so that the perforations or holes in the alternate and intermediate rows are interconnected through the interconnecting channels. These channels not only provide additional surface area in themselves which increases the sound absorbing characteristics of the layer, but also, where the foamed plastic forms a closed cell construction, exposes a multiplicity of opened cells at the walls defining the channels to give optimum acoustical absorption.

With the above described spacing of the channels, large pad surfaces 23 are provided by which the acoustical and thermal layers of the insulating structure may be adhesively joined or bonded together. This spaced arrangement of the back channels, while still providing interconnection between all the holes, is provided for by the offset arrangement of the adjacent rows of holes.

It has been determined empirically that the ratio between the frontal area of the holes 18 and the solid front area of the acoustical layer should preferably lie between .095 and .105. Hole areas providing a ratio below .095 compromise the acoustical result by giving unsatisfactory sound absorption, while hole areas giving a ratio greater than .105 do not significantly increase the acoustical effects enough to warrant the generally unappealing appearance of more or larger holes in the acoustical surface. As a result of this determination, the holes are preferably standardized at 3/16" diameter on 1/2" centers, although variations therefrom are obviously within the intended scope of the invention.

While the invention has been heretofore specifically described as being applied in the form of successive layers to the surface of the supporting wall of an enclosure, it will be understood that the thermal and acoustical layers may be bonded together in a preliminary, unsupported arrangement in the form of sheets, panels or tiles which can thereafter be applied to the surface of the supporting wall in a preformed sandwich construction. However, in the preferred embodiment of the invention specifically disclosed, the primarily sound absorbing layer 14 is supplied in the form of a rolled sheet 30, as shown in FIGURE 5, which is adhesively bonded to the surface of the previously mounted heat insulating layer 14 in a manner similar to the attachment of conventional wall paper or similar covering to a wall or ceiling. It will be further understood that, since the acoustical layer will cover any minor omissions or joints in the thermal insulating layer thereunder, this latter layer may be pieced together in any desired manner to afford an economy of material.

In the embodiment of this invention illustrated in FIGURE 4, the foamed plastic heat insulating layer 13 is shown bonded by the adhesive 12 to the enclosure supporting wall 11. The primarily sound absorbing layer 27 has its back face adhesively bonded to the front surface of the layer 13 by an adhesive 28 and is provided with perforations or holes 29 therethrough. The channels 21 of the preferred embodiment of the invention are omitted from the embodiment of FIGURE 4 and the acoustical layer 27 is here preferably formed from a foamed plastic in open cell construction, where the pattern of interconnecting internal holes will be, in effect, form passageways between the perforations or holes 29 and provide a maze labyrinth to aid in trapping the sound waves.

It will be understood that each of the layers 13 and 14, of the embodiment of FIGURES 1-3, and 13 and 27, of the embodiment of FIGURE 4, provide both acoustical and thermal insulation. However, the inner, and preferably thicker, layer 13 of the foamed plastic supplies primarily a thermal insulation while the outer layers 14 and 27, provided with the interconnected perforations 18 and 29, respectively, are primarily concerned with acoustical insulation or sound absorption. The layer 13 is preferably formed of a closed cell construction as this provides greater thermal insulation and non-water absorption characteristics. The layer 14 may be formed of either closed or open cell construction and both embodiments of the invention have been shown and described.

The embodiment of the invention shown in FIGURE 4 has its acoustical layer 27 preferably formed of foamed plastic in open cell construction since this construction is relied upon to effect a maze labyrinth effectively interconnecting the perforations 29.

While certain preferred embodiments of the invention have been specifically illustrated and described, it will be understood that the invention is not limited thereto as many variations will be apparent to those skilled in the art and the invention is to be given its broadest interpretation within the terms of the following claims.

I claim:

1. A sound absorbing structural material comprising: a sheet of acoustical insulating material having a plurality of sound wave absorbing perforations extending therethrough, said perforations being evenly spaced in rows with adjacent rows offset longitudinally a distance substantially equal to half the spacing between the individual perforations in the rows, said sheet having a plurality of channels in its back face interconnecting said perforations, one group of said channels extending in one direction and directly communicating with alternate rows of perforations, and a second group of said channels extending angularly to and intersecting said one group and directly communicating with the intermediate rows of perforations.

2. A sound absorbing structural material comprising: a sheet including a body portion of foamed plastic having a plurality of sound wave absorbing perforations extending therethrough, said perforations being evenly spaced in rows with adjacent rows offset longitudinally a distance substantially equal to half the spacing between the individual perforations in the rows, said body portion having a plurality of passages therein interconnecting said perforations, one group of said passages extending in one direction and directly communicating with alternate rows of perforations, and a second group of said passages extending angularly to and intersecting said one group and directly communicating with the intermediate rows of perforations.

3. A sound absorbing structural material as defined in claim 2 in which said passages are channels in the back face of said body portion providing pads therebetween of relatively large surface area for adhesively bonding the flexible sheet to a supporting structure.

4. A sound absorbing structural material comprising: a flexible sheet having a body portion of foamed plastic and a covering of strong plastic cloth bonded to the front face of said body portion, said body portion and covering having a plurality of sound wave absorbing perforations extending therethrough, said perforations being evenly spaced in rows with adjacent rows offset longitudinally a distance substantially equal to half the spacing between the invididual perforations in the rows, said body portion having a plurality of passages therein interconnecting said perforations and extending to the rear face of said body portion, the passages interconnecting alternate rows extending in one direction and the passages interconnecting the intermediate rows extending angularly thereto in intersecting relation so that all of said perforations are interconnected through said interconnecting passages.

5. An acoustical and thermal insulating structure comprising: a relatively thick rear layer of foamed plastic, self-supporting in character and adapted to be adhesively bonded to a supporting surface; a flexible sheet of foamed plastic also of self-supporting character and adhesively bonded at its back surface to the front surface of said first layer; and a covering of strong plastic cloth adhesively bonded to the front face of said flexible sheet; said flexible sheet and covering having a plurality of sound wave absorbing perforations extending therethrough, said perforations being evenly spaced in rows with adjacent rows offset longitudinally a distance substantially equal to half the spacing between the individual perforations, said sheet having a first group of channels in its back face extending in one direction to directly connect with the perforations in alternate rows and a second group of channels in its back face extending angularly to said first group of channels and directly communicating with the perforations in the intermediate rows, said groups of channels intersecting so as to intercommunicate all of said perforations.

6. An acoustical and thermal insulating structure comprising: a relatively thick rear layer of foamed plastic, self-supporting in character and adapted to be adhesively bonded to a supporting surface; a flexible sheet of foamed plastic also of self-supporting character and adhesively bonded at its back surface to the front surface of said first layer; and a covering of strong plastic cloth adhesively bonded to the front face of said flexible sheet, said flexible sheet and covering having a plurality of sound wave absorbing perforations extending therethrough, said perforations being evenly spaced in rows with adjacent rows offset longitudinally a distance substantially equal to half the spacing between the individual perforations, said sheet having a first group of channels at its back face extending in one direction to directly connect with the perforations in alternate rows and a second group of channels in its back face extending angularly to said first group of channels and directly communicating with the perforations in the intermediate rows, said groups of channels intersecting so as to inter-communicate all of said perforations, said channels being closed by the front face of said rear layer and providing pads therebetween of relatively large surface area which are adhesively bonded to said rear layer.

References Cited in the file of this patent

UNITED STATES PATENTS

| | | |
|---|---|---|
| 1,833,143 | Weiss | Nov. 24, 1931 |
| 2,001,916 | Mazer | May 21, 1935 |
| 2,165,101 | Hudson | July 4, 1939 |
| 2,285,423 | Esser | June 9, 1942 |
| 2,959,242 | Muller et al. | Nov. 8, 1960 |
| 2,981,360 | Fritze et al. | Apr. 25, 1961 |
| 2,984,312 | Brisley et al. | May 16, 1961 |

FOREIGN PATENTS

| | | |
|---|---|---|
| 412,923 | Great Britain | July 3, 1934 |
| 761,132 | Great Britain | Nov. 14, 1956 |
| 133,356 | Sweden | Oct. 23, 1951 |
| 492,353 | Canada | Apr. 28, 1953 |
| 1,015,972 | France | Aug. 13, 1952 |